(12) United States Patent
Komashinskiy et al.

(10) Patent No.: US 12,506,761 B2
(45) Date of Patent: Dec. 23, 2025

(54) METHOD OF THREAT DETECTION IN A THREAT DETECTION NETWORK AND THREAT DETECTION NETWORK UTILIZING THREAT DETECTION MODEL AND LOCAL CONSISTENCY MODEL

(71) Applicant: WithSecure Corporation, Helsinki (FI)

(72) Inventors: Dmitriy Komashinskiy, Helsinki (FI); Paolo Palumbo, Helsinki (FI)

(73) Assignee: WITHSECURE CORPORATION, Helsinki (FI)

( * ) Notice: Subject to any disclaimer, the term of this patent is extended or adjusted under 35 U.S.C. 154(b) by 234 days.

(21) Appl. No.: 18/317,723

(22) Filed: May 15, 2023

(65) Prior Publication Data
US 2023/0370485 A1    Nov. 16, 2023

(30) Foreign Application Priority Data
May 16, 2022    (EP) .................................. 22173414

(51) Int. Cl.
*H04L 9/40*          (2022.01)
(52) U.S. Cl.
CPC ...... *H04L 63/1425* (2013.01); *H04L 63/1416* (2013.01)
(58) Field of Classification Search
CPC ........................ H04L 63/1416; H04L 63/1425
See application file for complete search history.

(56) References Cited

U.S. PATENT DOCUMENTS

| 2018/0048667 | A1* | 2/2018 | Tang .................. H04L 41/145 |
| 2019/0166144 | A1  | 5/2019 | Mirsky et al. |
| 2020/0074078 | A1  | 3/2020 | Saxe et al. |
| 2021/0273953 | A1  | 9/2021 | Fellows et al. |
| 2022/0114260 | A1* | 4/2022 | Udupi Raghavendra ................... G06F 21/577 |
| 2022/0191224 | A1* | 6/2022 | Ståhlberg ............... G06F 21/554 |
| 2022/0351744 | A1* | 11/2022 | Krishnan ............... G06N 3/045 |

(Continued)

OTHER PUBLICATIONS

European Search Report for EP 22 17 3414 dated Oct. 5, 2022, 2 pages.

(Continued)

*Primary Examiner* — Mohamed A. Wasel
(74) *Attorney, Agent, or Firm* — NIXON & VANDERHYE

(57) ABSTRACT

A network node of a threat detection network, a backend system of a threat detection network including interconnected network nodes and a backend system, a threat detection network and a threat detection method for such network detect network threats. The backend system utilizes a backend threat detection model, and at least part of f the network nodes include security agent modules collecting data related to the respective network node. The network nodes utilize a local threat detection model and a local consistency model. The local consistency model provides confidence level information between the local and backend detection models. The method includes collecting data related to the network node by the security agent module at the network node, applying local threat detection model to the collected data, and making a decision at the endpoint based on the results of the local threat detection model and consistency models.

20 Claims, 3 Drawing Sheets

(56) References Cited

U.S. PATENT DOCUMENTS

2022/0400127 A1* 12/2022 Hen .................... H04L 63/1425
2023/0113375 A1*  4/2023 Thomas ............. H04L 63/1441
                                                                726/23

OTHER PUBLICATIONS

Wang Qi: "Automotive Proxy-Based Security 1-16 Architecture for CE Device Integration", Jan. 1, 2020, XP055917342, Retrieved from the Internet: URL:https://www.ideals.illinoise.edu/bitstream/handle/2142/109385/WANG-DISSERTATION-2020.pdf?sequence=1&isAllowed=y [retrieved on May 3, 2022], 149 pages.

\* cited by examiner

METHOD OF THREAT DETECTION IN A THREAT DETECTION NETWORK AND THREAT DETECTION NETWORK UTILIZING THREAT DETECTION MODEL AND LOCAL CONSISTENCY MODEL

CROSS-REFERENCE TO RELATED APPLICATION

This application claims the priority under 35 USC 119(a) of EP patent application 22173414.8 filed on May 16, 2022, the entirety of which is incorporated herein by reference.

TECHNICAL FIELD

The present invention relates to a method of threat detection in a threat detection network, a network node of a threat detection network, a backend system of a threat detection network and a threat detection network.

BACKGROUND OF THE INVENTION

Security and threat detection systems for computers and computer networks are used to detect threats and anomalies in computers and networks. Examples of such are Endpoint Protection Platform (EPP), Endpoint Detection & Response (EDR) and Managed Detection and Response (MDR) products and services. An endpoint protection platform (EPP) is a solution deployed on endpoint devices to prevent file-based malware attacks, detect malicious activity, and provide the investigation and remediation capabilities needed to respond to dynamic security incidents and alerts. Also, EDR systems focus on the detection and monitoring of a breach as it occurs and helps to determine how best to respond the detected breach. MDR in turn is a managed cybersecurity service providing service for threat detection, response, and remediation. The growth of efficient and robust threat detection solutions has been made possible in part by the emergence of machine learning, big data and cloud computing.

EPP, EDR or other corresponding systems deploy data collectors on selected network endpoints, which can be any elements of IT infrastructure. The data collectors observe activities happening at the endpoint and then send the collected data to a central, backend system, often located in the cloud. When the backend receives data, the data is processed (e.g. aggregated and enriched) before being analyzed and scanned by the security system provider for signs of security breaches and anomalies.

To counteract modern cyberthreats effectively it is important to operate as close to the entity to protect as possible; when the entities to protect are endpoints, this means moving data collection, analysis, threat detection, response and remediation capabilities as close to the endpoints as possible.

Achieving such a goal is a complex task that requires significant effort, and this effort can take many forms. In many cases machine learning (ML) is used in achieving this goal. Machine learning itself can be used in many ways in this domain and one of these possible ways focuses on applying on-device machine learning models for proactive and rapid detection of malware on end user devices.

This approach has several downsides, including the problem of the limited capabilities of on-sensor machine learning models. Particularly, an on-sensor malware detection machine learning model must provide a reasonable quality of decisions while keeping resource consumption to a minimum so that user experience is not compromised. For instance, dynamic analysis techniques are better at capturing an object behavior in comparison to static analysis ones. At the same time, dynamic analysis techniques tend to be more intensive for the machines on which they are run, and this performance overhead ends up limiting their applicability at endpoint devices. As a result, hybrid solutions are also presented in which simpler and less resource-hungry analysis techniques are run on the endpoint to process simpler cases, while more sophisticated ones are handled with the assistance of cloud-powered detection mechanisms, where a high-quality decision can be obtained thanks to the more powerful attribute extraction and analysis techniques.

One of the key challenges in designing such hybrid systems is distinguishing between tasks that are relatively simple and those that are instead sophisticated and cannot be dealt with the simple endpoint-side models and analysis capabilities.

Thus, there is a need to achieve a reliable threat detection system which also able to keep the resource consumption at a reasonable level.

SUMMARY OF THE INVENTION

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

According to a first aspect, the invention relates to a method, e.g. a computer implemented method, of threat detection in a threat detection network, the threat detection network comprising interconnected network nodes and a backend system, wherein the backend system utilizes a backend threat detection model. At least part of the network nodes comprise security agent modules which collect data related to the respective network node, wherein the network nodes utilize a local threat detection model and a local consistency model. The local consistency model is configured to provide a confidence level information between the local threat detection model and the backend threat detection model. The method comprises collecting data related to the network node by the security agent module at the network node, applying local threat detection model to the collected data, and making a security related decision at the endpoint based on the results of the local threat detection model and the local consistency model.

In one embodiment of the invention the confidence level information between the local threat detection model and the backend threat detection model comprises an estimate of the agreement between the verdicts provided by the local threat detection model and of the backend threat detection model utilized by the backend system.

In one embodiment of the invention, when the confidence level information provided by the local consistency model is high and/or above a certain confidence level value, the security related decision at the network node is done independently by the network node.

In one embodiment of the invention, when the confidence level information provided by the local consistency model is low and/or below a certain confidence level value, the security related decision at the network node is done based on the context of the network node, such as availability of a network connectivity, e.g. internet connectivity.

In one embodiment of the invention, if the network node and/or the security agent module of the network node is online, the network node queries the backend to utilize the backend threat detection model on a detected object, and security related decision is done based on the backend security threat model.

In one embodiment of the invention, if the network node and/or the security agent module of the network node is offline, the network node moves a detected object to quarantine and queries the backend to utilize the backend threat detection model to the object when the network node and/or the security agent module of the network node is online for making a security related decision based on the backend security threat model.

In one embodiment of the invention, when the confidence level information provided by the local consistency model is medium and/or between certain confidence level values, the security related decision at the network node is done based on the context of the network node comprising network connectivity and further context information relating to the network node, such as type of the network node and/or risk level of use active user.

In one embodiment of the invention a set of attributes that are extracted from an object at the network node for the local threat detection model comprise a subset of a set of attributes that are extracted from the network node at the back end.

In one embodiment of the invention the consistency model is prepared based on the results of validation between a local threat detection model and the backend threat detection model.

In one embodiment of the invention the backend threat detection model, the local threat detection model and/or the consistency model are prepared at the backend system.

In one embodiment of the invention preparation of machine learning based threat detection models comprises defining backend threat model features, defining local threat model features, training backend threat detection model and local threat detection model based on training data and training consistency model based on validation data, local threat detection model and backend threat detection model.

According to a second aspect, the invention relates to a network node of a threat detection network, the network comprising interconnected network nodes and a backend system. The network node comprises at least one or more processors and at least one security agent module which is configured to collect data related to the respective network node. The network node is further configured to utilize a local threat detection model and a local consistency model, wherein the local consistency model trained and/or provided by the backend system is configured to provide a confidence level information between the local threat detection model and the backend threat detection model. The network node is configured to collect data related to the network node by the security agent module at the network node, to apply local threat detection model to the collected data, and to make a security related decision at the endpoint based on the results of the local threat detection model and the local consistency model.

According to a third aspect, the invention relates to a backend system of a threat detection network, the threat detection network comprising interconnected network nodes and a backend system. The backend system comprises at least one server comprising at least one or more processors and configured to utilize a backend threat detection model. The backend system is further configured to train and/or provide to network nodes a local threat detection model and a consistency model, wherein the local consistency model trained and/or provided by the backend system is configured to provide a confidence level information between the local threat detection model and the backend threat detection model. The backend system may be (optionally) further configured to receive data related to the network node collected by the security agent module at the network node, apply backend threat detection model to the received data, and/or provide information related to a security related decision for the endpoint based on the results of the backend detection model.

According to a fourth aspect, the invention relates to a threat detection network comprising at least one network node according to invention and/or at least one backend system according to the invention.

According to a fifth aspect, the invention relates to a computer program comprising instructions which, when executed by a computer, cause the computer to carry out a method according to the invention.

According to a sixth aspect, the invention relates to a computer-readable medium comprising the computer program according to the invention.

With the solution of the invention, it's possible to achieve a reliable threat detection system which also able to keep the resource consumption at a reasonable level. With the solution of the invention reliable threat detection results can be provided even when the conditions change, e.g. the node or endpoint is offline or online. The system is able to adapt to the threat level to the changing conditions, e.g. so that the low risk threats can be handled offline and high risk threats can be quarantined and/or it can be waited that the node, device or endpoint is online.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated.

Furthermore, it is to be understood that the use of "a" or "an", i.e. a singular form, throughout this document does not exclude a plurality.

BRIEF DESCRIPTION OF THE DRAWINGS

The embodiments of the invention are illustrated by way of example, and not by way of limitation, in the figures of the accompanying drawings.

DETAILED DESCRIPTION

A threat detection network according to one embodiment of the invention may comprise at least one network node and a backend system comprising at least one backend server. In this case information, e.g. threat detection related data, can be shared between the nodes and/or between the nodes and the backend system.

Figure 1:
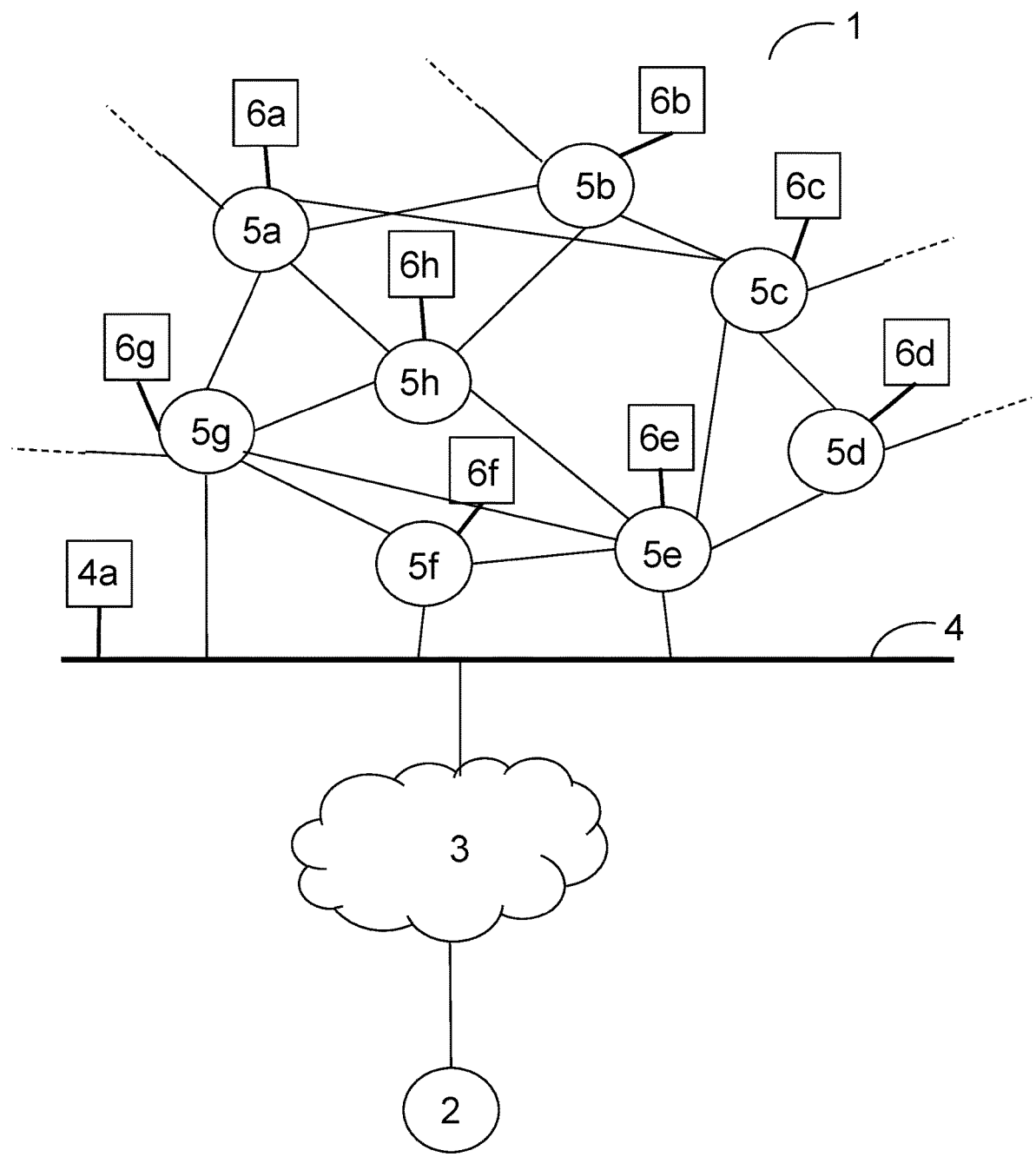
FIG. 1 presents schematically an example network architecture of one embodiment of the invention.

FIG. 1 presents schematically an example network architecture of one embodiment of the invention in which the solution of the invention can be used. In FIG. 1 a part of a first computer network 1 is schematically illustrated into which a computer system, for example an EPP or an EDR system, has been installed. Also, any other computer system that is able to implement the embodiments of the invention can be used instead or in addition to the EPP or EDR system used in this example. The first computer network is connected to a security service network, here security backend system or server 2 through the cloud 3. The backend system or server 2 forms a node on the security service computer network relative to the first computer network. The security service computer network can be managed by an threat detection system provider and may be separated from the cloud 3 by a gateway or other interface (not shown) or other network elements appropriate for the backend 2. The first computer network 1 may also be separated from the cloud 3 by a gateway 4 or other interface. Other network structures are also possible.

The first computer network 1 is formed of a plurality of interconnected network nodes 5a-5h, each representing an element in the computer network 1 such as a computer, smartphone, tablet, laptop, or other piece of network enabled hardware. In one embodiment of the invention the node is any device on the network but not a gateway. Each network node 5a-5h shown in the computer network also represents an endpoint, e.g. an EDR endpoint or EPP endpoint, onto which a security agent module 6a-6h, that may include a data collector or "sensor", is installed. Security agent modules may also be installed in some embodiments of the invention on any other element of the computer network, such as on the gateway or other interface. In the example of FIG. 1 a security agent module 4a has been installed on the gateway 4. The security agent modules, 6a-6h, 4a collect various types of data at the nodes 5a-5h or gateway 4 including, for example, program or file hashes, files stored at the nodes 5a-5h, logs of network traffic, process logs, binaries or files carved from memory (e.g. DLL, EXE, or memory forensics artefacts), and/or logs from monitoring actions executed by programs or scripts running on the nodes 5a-5h or gateway 4 (e.g. tcp dumps). The data collected may be stored in a database or similar model for information storage for further use. Any kind of threat detection models and consistency models may further be constructed at the backend/server 2, and/or at a second server and be stored in the database. The nodes 5a-5h and the server 2 typically comprise a hard drive, a processor, and RAM.

Any type of data which can assist in detecting and monitoring a security threat, such as a security breach or intrusion into the system, may be collected by the security agent modules 6a-6h, 4a during their lifecycle and that the types of data which are observed and collected may be set according to rules defined by the threat detection system provider upon installation of the threat detection system and/or when distributing components of a threat detection model and/or a behavior model. In an embodiment of the present invention, at least part of the security agent modules 6a-6h may also have capabilities to make decisions on the types of data observed and collected themselves. For example, the security agents 6a-6h, 4a may collect data about the behavior of programs running on an endpoint and can observe when new programs are started. Where suitable resources are available, the collected data may be stored permanently or temporarily by the security agent modules 6a-6h, 4a at their respective network nodes or at a suitable storage location on the first computer network 1 (not shown).

The security agent modules 6a-6h, 4a are set up such that they send information such as the data they have collected or send and receive instructions to/from the threat detection system backend 2 through the cloud 3. This allows the threat detection system provider to remotely manage the system without having to maintain a constant human presence at the organization which administers the first computer network 1.

In one embodiment of the invention, the security agent modules 6a-6h, 4a can also be configured to establish an internal network, e.g. an internal swarm intelligence network, that comprises the security agent modules of the plurality of interconnected network nodes 5a-5h of the local computer network 1. As the security agent modules 6a-6h, 4a collect data related to the respective network nodes 5a-5h of each security agent module 6a-6h, 4a, they are further configured to share information that is based on the collected data in the established internal network. In one embodiment a swarm intelligence network is comprised of multiple semi-independent security nodes (security agent modules) which are capable of functioning on their own as well. Thus, the numbers of instances in a swarm intelligence network may well vary. There may also be more than one connected swarm intelligence networks in one local computer network, which collaborate with one another.

The security agent modules 6a-6h, 4a and/or the backend system are further configured to use the collected data and information received from the internal network for generating and adapting models related to the respective network node 5a-5h and/or its users. Models can be for example threat detection models, and/or consistency models.

Figure 2:
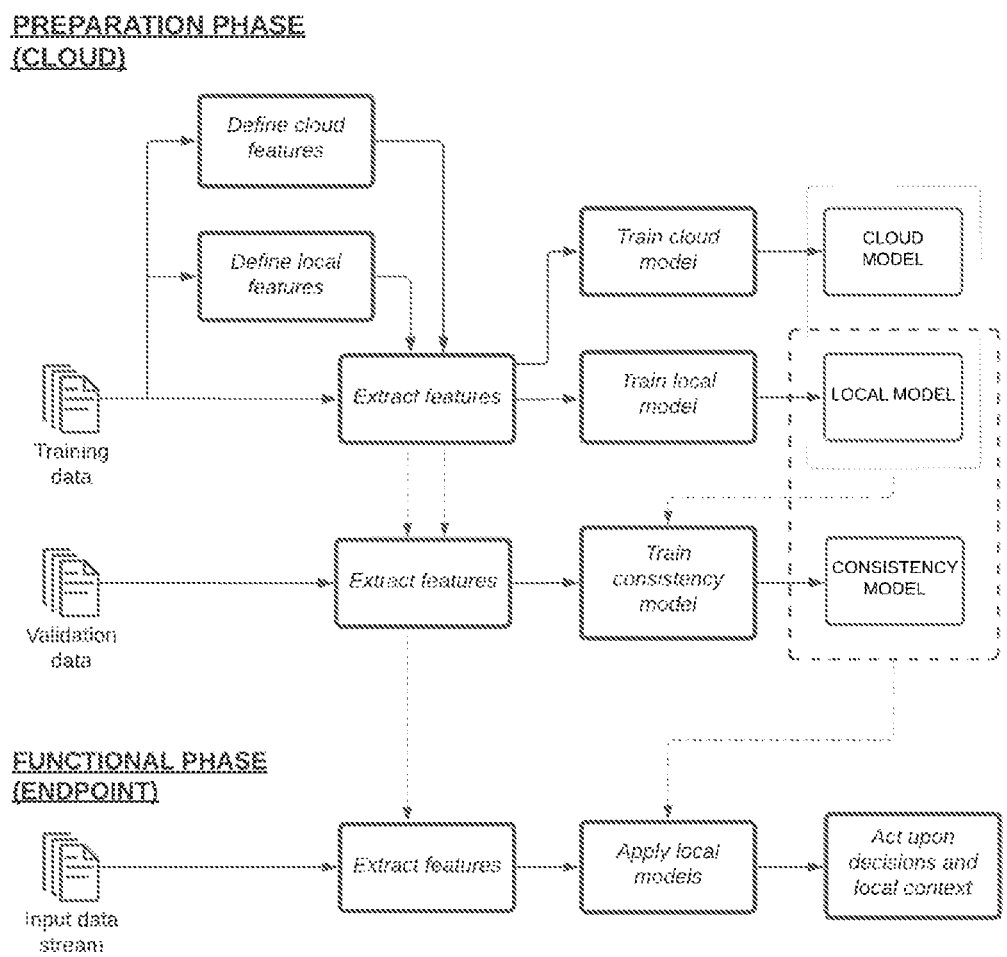
FIG. 2 presents an example embodiment of a solution of the invention relating to preparation phase and functional phase.

FIG. 2 presents an example embodiment of a solution of the invention relating to preparation phase and functional phase according to one embodiment of the solution of the invention. The preparatory phase can be used to produce a set of items that are critical for the functioning of the functional phase, e.g. the set of features that are used to represent the particular object the classifier will have to work with, and decision model that leverages the representation of an object based on the above-mentioned features to classify the objects it is fed.

Preparation of machine learning based threat detection models can comprise defining backend threat model features, defining local threat model features, training backend threat detection model and local threat detection model based on training data and training consistency model based on validation data, local threat detection model and backend threat detection model.

In one embodiment, preparation of the models the endpoint features and cloud and/or backend features can be defined. Based on training data and the defined features, e.g. a cloud/backend threat detection model and local threat detection model can be trained. The models can be e.g. machine learning models. During the preparatory phase, the training data can undergo a preprocessing to find and select an appropriate set of features that can represent effectively the given data. Such features are then leveraged during the preparation of a decision model. After the conclusion of the preparatory phase both the feature definitions and the trained models are used against incoming unknown input objects. Each object in the input flow of previously unseen items is mapped to the appropriate space as dictated by the selected features. Such representation of the input object is then fed to the trained model and the prediction of the model is collected, alongside any further output for the model.

The solution of the invention uses machine learning models available at the endpoint and at the backend for the detection of malicious objects and/or malicious behavior. In the example of FIG. 2, both the sensor-side detection model and the cloud detection model are trained in the backend system e.g. in the cloud and for example in the above described way. The sensor-side detection model can be a lightweight model with limited capabilities and the backend detection model is less limited and therefore more reliable model. The sensor-side detection model relies on the set of features that can be extracted sensor-side while the backend detection model is not so limited and can be considered a superset of the endpoint one. The backend side model can operate over many of those attributes that cannot be extracted or analyzed on the endpoint sensor due to the performance overhead.

At the end of the training process of the local and backend threat detection models the results of validation for these models are compared so that for the attribute space the sensor-side model relies on, yet another real-valued function is obtained. This function represents the consistency level of both models and can be called a consistency model. Thus, the consistency model can be trained and/or prepared based on validation data, the extract features and the trained local threat detection model and the trained backend/cloud threat detection model. This mapping of the consistency level can be provided as a machine learning mode to the endpoint to support sensor-side machine learning threat detection model. The sensor-side models and consistency models can then be transmitted to sensors. At the endpoint side, whenever a decision is requested to the sensor-side machine learning detection model, the consistency model can be consulted as well. The consistency model is prepared so that it can provide information of how trustworthy the output of the detection model will be. Thus, the endpoint applies local threat detection model to the collected data and makes a security related decision at the endpoint based on the results of the local threat detection model and the local consistency model.

The confidence level information between the local threat detection model and the backend threat detection model is used to give an estimate of the agreement between the verdicts provided by the local threat detection model and of the backend threat detection model utilized by the backend system.

The consistency model can be used e.g. in serial or in parallel with the threat detection model of the endpoint. Usage of the models can also depend on the context, risk level and other factors relating to the endpoint and/or threat detection. In one example embodiment, when the confidence level provided by the consistency model is high, the sensor could decide to act upon the local (i.e., sensor-side) decision independently. Otherwise, the sensor can act according to the context, for example in the following way:
 If the endpoint and/or the endpoint sensor is online and the confidence level provided by the consistency model level is low, using the sensor-side detection model can be omitted; the object can be submitted to cloud instead and the endpoint can act upon the decision provided by the cloud;
 If the endpoint and/or the endpoint sensor is offline and the confidence level provided by the consistency model level is low, the object can be moved to a temporal quarantine, the user can be notified and the object can be submitted to the cloud once the sensor goes to the online state;
 If the confidence level provided by the consistency model level is medium and the cloud decision is postponed, the endpoint can rely on additional context information like the type of the endpoint (such as a server, not a server) and/or risk level of use active user, etc.

Figure 3:
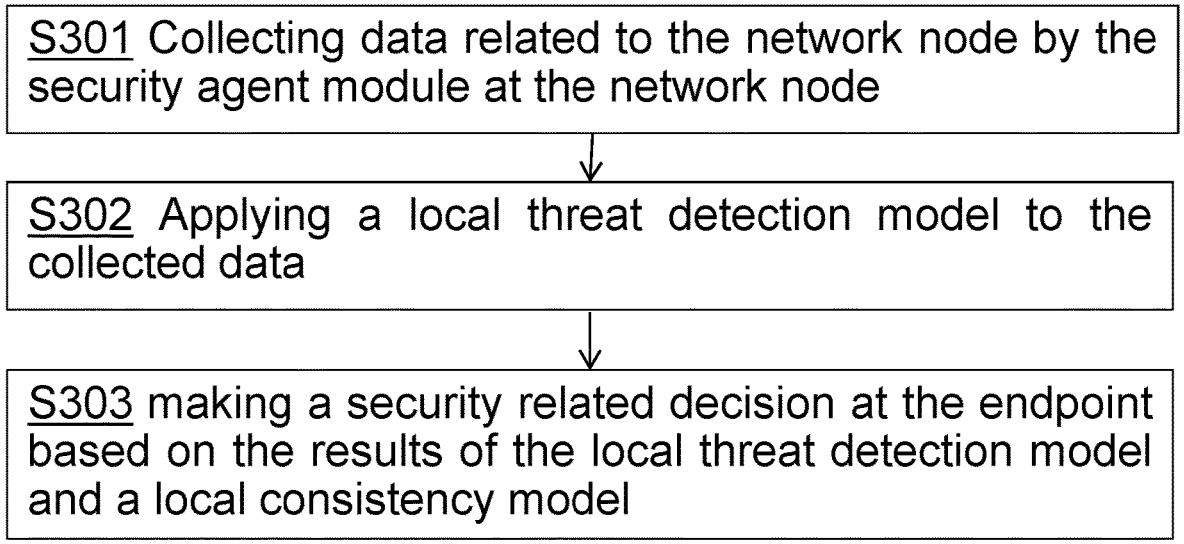
FIG. 3 presents an example method according to one embodiment of the invention.

FIG. 3 presents an example method according to one embodiment of the invention. In the example method at step S301 data is collected related to the network node by the security agent module at the network node. Then at step S302 a local threat detection model is applied to the collected data, and at step S303 a security related decision is made at the endpoint based on the results of the local threat detection model and the local consistency model.

One example scenario is presented in the following paragraphs. In this example embodiment raw data related to actions on a network node is received. The raw data may be received/collected from plurality of network nodes (5a-5h), wherein dissimilar data types can be aligned as input events and collected into submissions. There can be multiple different types of events. In one embodiment of the invention the sensor collects events for a few seconds and then sends these collected events in one transmission to reduce the number of network connections and/or requests. The submission processing components can be responsible for an initial pre-processing of all data submissions that are received from various kinds of endpoint sensors.

The raw data related to each network node may be collected by a network node of a computer network, and/or a security server backend from a plurality of network nodes of a computer network. The observed events related to the network node are effectively something measurable that are caused by multitude of underlying processes/actors. Such actors can be actual users or the operating system, for example.

A threat in the network and/or at the network node can be identified by utilizing machine learning threat detection models, e.g. local threat detection models and backend threat detection models, according to the solution of the invention.

In an embodiment, further actions may be taken to secure the computer network and/or any related network node when a threat has been detected, for example increasing level of data collection, sending the data to the backend that didn't match the generated local behavior model and/or the received behavior model, heightening a risk level of the user, heightening a risk level of the node and/or alerting an operator, and/or taking immediate action by changing the settings of the network nodes in order to ensure an attacker is stopped and any traces of their moves is not destroyed. Changing the settings may include, for example, one or more nodes (which may be computers or other devices) being prevented from being switched off in order to preserve information in RAM, a firewall may be switched on at one or more nodes to cut off the attacker immediately, network connectivity of one or more of the network nodes may be slowed down or blocked, suspicious files may be removed or placed into quarantine, logs may be collected from network nodes, sets of command may be executed on network nodes, users of the one or more nodes may be warned that a threat or anomaly has been detected and that their workstation is under investigation, and/or a system update or software patch may be sent from the threat detection backend to the nodes in response to detecting a sign of a deviation from normal behavior. In one embodiment of the invention one or more of these actions may be initiated automatically by the above-described models or algorithms. For example, using the above-described methods, data has been collected and shared with the nodes in the computer network and the threat detection backend and a threat model or an analysis algorithm has determined that a threat was detected. As soon as the model/algorithm makes the determination about the threat, it may generate and issue a command to the related network nodes without human intervention to automatically initiate one or more of the above-described actions at the nodes. By doing this, a breach can be stopped and/or the damage minimized automatically at very high speeds and without human intervention.

In an embodiment, a suspicious event among the monitored events may be detected by one or more detection mechanisms used. In an embodiment, the detection mechanisms used to detect the suspicious event may comprise using (in addition to machine learning models) a scanning engine, a heuristic rule, a statistical anomaly detection, fuzzy logic-based models, any predetermined rules.

Inputs for the machine learning models used in the solution of the invention, e.g. the backend threat detection model, the local threat detection model, the local consistency model, can be various objects. These can be for example executable files and documents, URIs, log trace entities and their aggregates over time windows, processes, users, etc. Different input types can be represented by own feature sets.

Outputs of the machine learning models used in the solution of the invention can depend on the problem a certain model tries to address. For malware detection domain, the outputs of the models can be for example binary (i.e. binary classification task, e.g. 'malicious' or 'benign'), categorical (i.e. multiclass classification problem, categories being e.g. 'adware', 'riskware', 'malware', 'greyware', etc.) and/or numerical (e.g. regression tasks for risk score, anomaly level assessment, etc.). For MDR or EDR machine learning models, the outputs can be of the same types representing results of producing local detections, response actions, anomaly levels of events, processes, users, various priority assignment recommendations, etc.

The types of machine learning models used in the solution of the invention can depend on the problem (e.g. types of input and/or output features) and available data (e.g. availability of labels and their types). For example, a binary classification task can imply availability of labels in the training data and can be solved with a number of methods including logistic regression, neural networks, decision trees and their advanced versions relying on bagging and boosting techniques.

In an embodiment, the method may further comprise preparing and training machine learning models used in the detection of threats, such as local threat detection model, the backend threat detection model, a local consistency model, and/or as a response to threats by utilizing one or more following approaches used for training machine learning models: distributed learning via combining local and global information and model parts, reinforcement learning via getting feedback on successful end results, meta-learning via utilizing external information in the learning process; and/or information sharing to bootstrap models and adjust learning behavior.

In one embodiment of the invention a threat detection model used in the solution of the invention, e.g. a backend threat detection model, a local threat detection model, is trained over pre-existing data, i.e. training data. Training data can comprise a plurality of training data elements which can be associated e.g. with at least one maliciousness related property or feature. This trained model can be deployed to produce predictions about new relevant objects. The performance of the model may need to be controlled continuously over time, because, for example, threats evolve, and training data is not perfect. To maintain the required level of performances, the training data can be updated and the model re-trained, e.g. periodically.

In one embodiment of the invention, during the preparatory phase, the training data can undergo a preprocessing to find and select an appropriate set of features that can represent effectively the given data. Such features can be then leveraged during the preparation of a decision model. After the conclusion of the preparatory phase both the feature definitions and the trained model can be used against incoming unknown input objects. Each object in the input flow of previously unseen items is mapped to the appropriate space as dictated by the selected features. Such representation of the input object can be then fed to the trained model and the prediction of the model is collected, alongside any further output for the model.

Local threat detection models can function e.g. at endpoint or device side. Local threat detection models can be trained e.g. with features that in general make their performance faster for the cost of predictive power (this is due to limited number of features and applying lightweight features extraction routines that often are less informative in comparison with advanced ones). The models can rely on features which can be obtained fast, computationally inexpensive (e.g. lightweight features available from static processing) and safe (does not require potentially unsafe local operations like controlled execution). For instance, in endpoint protection products those features can pertain to byte n-grams, strings, contents of file headers and other inner structures and data blocks available from static analysis of embedded active content (as well as results of parsing sections and disassembly of executable code, embedded scripts and macro). In detection and response services the features can also comprise information from available traces of computer programs and system and/or user logs as well as other facts available from sensor side auxiliary systems like malware detection engines, memory scanners and reputation services.

Backend threat detection models can be trained with features that improve their predictive abilities for the cost of performance (this can be due e.g. to bigger number of used features and applying advanced, resource expensive feature extraction techniques). Backend threat detection models can have access to all inputs available for local threat detection models and, in addition, e.g. for endpoint protection products they can also rely on features which are challenging to obtain for a single endpoint, like results of dynamic analysis of embedded active content (e.g. controlled execution, emulation and sandboxing) and attributes that become available after applying the dynamic analysis techniques (e.g. byte n-grams, strings, contents of file headers and other inner structures and data blocks that are inaccessible for static analysis techniques). In detection and response services the features of the models can also include information available from traces of computer programs and system and/or user logs as well as other facts obtainable from all sensors so they can use general context in addition to local ones.

Local consistency models function at endpoint side and, therefore, deal with features that are obtainable locally, e.g. at the endpoint or device. At the same time, in one embodiment of the invention the feature sets used by the consistency models are don't have to be the same as local threat detection models rely on, since they focus on the different objective of presenting level of consistency between local and backend threat detection models for a given input.

If labels are used e.g. for the training data, at least some of these may come from analysts, threat hunters, incident investigators and other people having the domain's knowledge and other sources like various open reputation services, info exchange programs etc. In some embodiments labeled data is not required, for example many anomaly detection methods are applicable in unsupervised learning fashion.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein. Lists and groups of examples provided in the description given above are not exhaustive unless otherwise explicitly stated.

The invention claimed is:

1. A method of threat detection in a threat detection network, the threat detection network comprising interconnected network nodes and a backend system,
   wherein the backend system utilizes a backend threat detection model,
   wherein at least part of the network nodes comprise security agent modules which collect data related to the respective network node, and wherein the network nodes utilize a local threat detection model and a local consistency model,
   wherein the local consistency model is configured to provide a confidence level information between the local threat detection model and the backend threat detection model,
   wherein the method comprises:
      collecting data related to the network node by the security agent module at the network node,
      applying local threat detection model to the collected data, and
      making a security related decision at the endpoint based on the results of the local threat detection model and the local consistency model.

2. The method according to claim 1, wherein the confidence level information between the local threat detection model and the backend threat detection model comprises an estimate of the agreement between the verdicts provided by the local threat detection model and of the backend threat detection model utilized by the backend system.

3. The method according to claim 1, wherein, when the confidence level information provided by the local consistency model is high and/or above a certain confidence level value, the security related decision at the network node is done independently by the network node.

4. The method according to claim 1, wherein, when the confidence level information provided by the local consistency model is low and/or below a certain confidence level value, the security related decision at the network node is done based on the context of the network node.

5. The method according to claim 1, wherein, in a case in which the network node and/or the security agent module of the network node is online, the network node queries the backend system to utilize the backend threat detection model on a detected object, and security related decision is done based on the backend security threat model.

6. The method according to claim 1, wherein, in a case in which the network node and/or the security agent module of the network node is offline, the network node moves a detected object to quarantine and queries the backend system to utilize the backend threat detection model to the object when the network node and/or the security agent module of the network node is online for making a security related decision based on the backend security threat model.

7. The method according to claim 1, wherein, when the confidence level information provided by the local consistency model is medium and/or between certain confidence level values, the security related decision at the network node is done based on the context of the network node comprising network connectivity and further context information relating to the network node.

8. The method according to claim 1, wherein a set of attributes that are extracted from an object at the network node for the local threat detection model comprises a subset of a set of attributes that are extracted from the network node for the backend system.

9. The method according to claim 1, wherein the consistency model is prepared based on the results of validation between a local threat detection model and the backend threat detection model.

10. The method according to claim 1, wherein preparation of machine learning based threat detection models comprises defining backend threat model features, defining local threat model features, training backend threat detection model and local threat detection model based on training data and training consistency model based on validation data, local threat detection model and backend threat detection model, and/or
    wherein the backend threat detection model, the local threat detection model and/or the consistency model are prepared at the backend system.

11. Network node of a threat detection network, the network comprising interconnected network nodes and a backend system, wherein
    the network node comprises at least one or more processors and at least one security agent module which is configured to collect data related to the respective network node, and
    the network node is further configured to utilize a local threat detection model and a local consistency model,
    wherein the local consistency model trained and/or provided by the backend system is configured to provide a confidence level information between the local threat detection model and the backend threat detection model,
    wherein the network node is configured to:
        collect data related to the network node by the security agent module at the network node,
        apply local threat detection model to the collected data, and
        make a security related decision at the endpoint based on the results of the local threat detection model and the local consistency model.

12. A backend system of a threat detection network, the threat detection network comprising interconnected network nodes and a backend system, wherein
    the backend system comprises at least one server comprising at least one or more processors and configured to utilize a backend threat detection model, wherein the backend system is further configured to train and/or provide to network nodes a local threat detection model and a consistency model, wherein the local consistency model trained and/or provided by the backend system is configured to provide a confidence level information between the local threat detection model and the backend threat detection model, wherein the backend system is configured to:
- receive data related to the network node collected by the security agent module at the network node,
- apply backend threat detection model to the received data, and
- provide information related to a security related decision for the endpoint based on the results of the backend detection model.

13. A threat detection network comprising:
at least one network node according to claim 11.

14. A threat detection network configured to carry out the method according to claim 2.

15. A non-transitory computer-readable medium on which is stored a computer program comprising instructions which, when executed by a computer, cause the computer to carry out the method according to claim 1.

16. The method of claim 4, wherein the context of the network node comprises internet connectivity.

17. The method of claim 7, wherein the further context information relating to the network node includes at least one of type of network node and risk level of the active user.

18. The threat detecting network of claim 13, further comprising a backend system of a threat detection network, the threat detection comprising interconnected network nodes and a backend system, wherein the backend system comprises at least one server comprising at least one or more processors and configured to utilize a backend threat detection model, wherein the backend system is further configured to train and/or provide to network nodes a local threat detection model and a consistency model, wherein the local consistency model trained and/or provided by the backend system is configured to provide a confidence level information between the threat local detection model and the backend threat detection model, wherein the backend system is configured to:
- receive data related to the network node collected by the security agent module at the network node,
- apply backend threat detection model to the received data, and
- provide information related to a security related decision for the endpoint based on the results of the backend detection model.

19. A threat detection network comprising at least one said backend system of claim 12.

20. The method according to claim 2, wherein, when the confidence level information provided by the local consistency model is high and/or above a certain confidence level value, the security related decision at the network node is done independently by the network node.

* * * * *